(12) United States Patent
Kokubu et al.

(10) Patent No.: US 7,271,701 B2
(45) Date of Patent: Sep. 18, 2007

(54) SYSTEM FOR COMMONLY UTILIZING VEHICLE

(75) Inventors: Mamoru Kokubu, Utsunomiya (JP); Takashi Uehara, Tokyo (JP); Yuji Uehara, Utsunomiya (JP); Shunsuke Hayase, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 146 days.

(21) Appl. No.: 10/484,845

(22) PCT Filed: Jul. 25, 2002

(86) PCT No.: PCT/JP02/07538

§ 371 (c)(1),
(2), (4) Date: Aug. 27, 2004

(87) PCT Pub. No.: WO03/010732

PCT Pub. Date: Feb. 6, 2003

(65) Prior Publication Data
US 2005/0012589 A1    Jan. 20, 2005

(30) Foreign Application Priority Data
Jul. 27, 2001  (JP)  ............................. 2001-228558

(51) Int. Cl.
*H04Q 9/00* (2006.01)
*H04Q 5/22* (2006.01)
*G06Q 10/00* (2006.01)

(52) U.S. Cl. .................... 340/5.72; 340/5.1; 340/5.9; 340/10.3; 340/825.28; 705/5

(58) Field of Classification Search ................ 340/5.1, 340/5.9, 10.3, 825.28; 705/5
See application file for complete search history.

(56) References Cited

U.S. PATENT DOCUMENTS 5,812,070 A *  9/1998  Tagami et al. ............ 340/932.2
6,160,488 A    12/2000 Honda
6,618,650 B1*  9/2003  Nakai et al. .................... 701/1

FOREIGN PATENT DOCUMENTS

EP    0 835 790 A2    4/1998
JP    4-111669         9/1992

(Continued)

*Primary Examiner*—Jeffery Hofsass
*Assistant Examiner*—Scott Au
(74) *Attorney, Agent, or Firm*—Arent Fox LLP (57) ABSTRACT

A system for commonly utilizing a vehicle in which illegal use of the vehicle can be surely prevented. In the system for lending a shared vehicle, which is parked in a parking area and of which the use information concerning lending and returning is managed, to a user after confirming permission to utilize the vehicle based on previously registered personal identification information, the shared vehicle is provided in the control section thereof with a popup key which can control whether a mechanical switch unit for starting the driving of the vehicle can be operated or not, and with an ignition mechanism control mean which permits starting operation of an ignition mechanism when personal cipher information inputted by the user matches personal cipher information imparted to the user in association with the personal identification information and the user sets a destination, and permits returning operation of the ignition mechanism when arrival at the set destination is detected.

2 Claims, 6 Drawing Sheets

FOREIGN PATENT DOCUMENTS

| | | |
|---|---|---|
| JP | 10-175512 | 6/1998 |
| JP | 10-315913 | 12/1998 |
| JP | 11-242778 | 9/1999 |
| JP | 11-282530 | 10/1999 |
| JP | 11-311037 | 11/1999 |
| JP | 2000-120308 | 4/2000 |
| JP | 2000-194981 | 7/2000 |
| JP | 2000-205869 | 7/2000 |
| JP | 2000-311287 | 11/2000 |
| JP | 3149384 | 1/2001 |

\* cited by examiner

SYSTEM FOR COMMONLY UTILIZING VEHICLE

TECHNICAL FIELD

The present invention relates to a system for commonly utilizing a vehicle in which use information concerning lending and returning of a vehicle that is parked in a parking area is managed and the vehicle is rented to a user.

This application is based on Japanese Patent Application No. 2001-228558, the contents of which are incorporated herein by reference.

BACKGROUND ART

Conventionally, a system in which a user approaches a vehicle which is parked in a parking area and makes the vehicle read personal identification information (user ID) recorded in an IC card, etc., to unlock the door so that the user is permitted to enter the inside of the vehicle has been conceived as a system for commonly utilizing a vehicle. However, in such a system for commonly utilizing a vehicle, it is unavoidable to keep the ignition key which is used for starting a driving device of the vehicle (engine, motor, etc.), inside the vehicle since the vehicle is managed and operated in an unwatched parking area in such a system for commonly utilizing a vehicle. Accordingly, there is a danger that the vehicle can be easily stolen if the door lock is broken.

In consideration of the above, a device which is capable of preventing theft of the vehicle while keeping the ignition key inside the vehicle has been proposed in, for example, Japanese Unexamined Patent Application, First Publication No. 2000-120308. In the device disclosed in the above patent application, a glove box having a key lock mechanism to store the ignition key in an unusable locked state is provided, and the key lock of the glove box is unlocked when the personal identification information in an IC card matches identification information of a person who made the reservation so that the use of the ignition key becomes possible.

Also, a method has been proposed in which a portable ignition key is avoided, and the ignition mechanism is entirely controlled by an electrical controlling means only, and the starting of the driving device of the vehicle is controlled thereby.

However, according to the above conventional techniques, although the possibility that the ignition key is stolen may be reduced by combining the door lock mechanism with the key lock mechanism to generate a double lock mechanism, there is a danger that the vehicle may be unlawfully utilized if the vehicle is lawfully lent to a user and the user copies the ignition key since the ignition key is easily removed from the vehicle.

Also, if the entire ignition mechanism is controlled only by an electrical controlling means, there are problems in that the vehicle cannot be driven if electric power cannot be supplied to the controlling means for some reasons, and it is troublesome to repair the vehicle.

DISCLOSURE OF INVENTION

The present invention takes into consideration the above-mentioned circumstances, and has as an object to provide a system for commonly utilizing a vehicle in which illegal use of the vehicle can be surely prevented.

In order to achieve the above object, the first aspect of the present invention provides a system for commonly utilizing a vehicle in which vehicle use information relating to lending and returning of a vehicle parked in a parking area is managed, and the vehicle is lent to a user by confirming permission to utilize the vehicle based on preregistered personal identification information, wherein the vehicle includes a mechanical switch device, which is used to start a driving device of the vehicle, as well as an ignition mechanism (for instance, the popup key 30 in an embodiment described later), which is capable of controlling an operation of the mechanical switch device; and an ignition mechanism controlling means (for instance, steps S17-S25, S31-S40 in the embodiment described later) which permits a starting operation of the driving device using the ignition mechanism when information input by the user matches personal cipher information imparted to the user in association with the personal identification information and the user sets a destination, and which permits a returning operation of the vehicle using the ignition mechanism when arrival at the set destination is detected.

According to the system having the above configuration, it becomes possible to control the lending and returning of the vehicle using the operation of the ignition mechanism provided with the mechanical switch device.

Also, it becomes possible to permit the return of the vehicle only when returning conditions are met.

The second aspect of the present invention provides a system for commonly utilizing a vehicle according to the first aspect, wherein the vehicle further includes a use information controlling means (for instance, steps S26 and S36 in the embodiment described later) which starts measurement of the vehicle use information when the starting operation of the driving device using the ignition mechanism is permitted, and which stops the measurement of the vehicle use information when the returning operation of the vehicle using the ignition mechanism is permitted. According to the system having the above configuration, it becomes possible to carry out a constant and accurate charging process regardless of the manner in which a vehicle is used since the start and stop of the measurement of the vehicle use state is carried out in accordance with the state of the ignition mechanism which indicates the start and end of the use of the vehicle.

BEST MODE FOR CARRYING OUT THE INVENTION

Hereinafter, embodiments of the present invention will be described with reference to the accompanying drawings.

Figure 1:
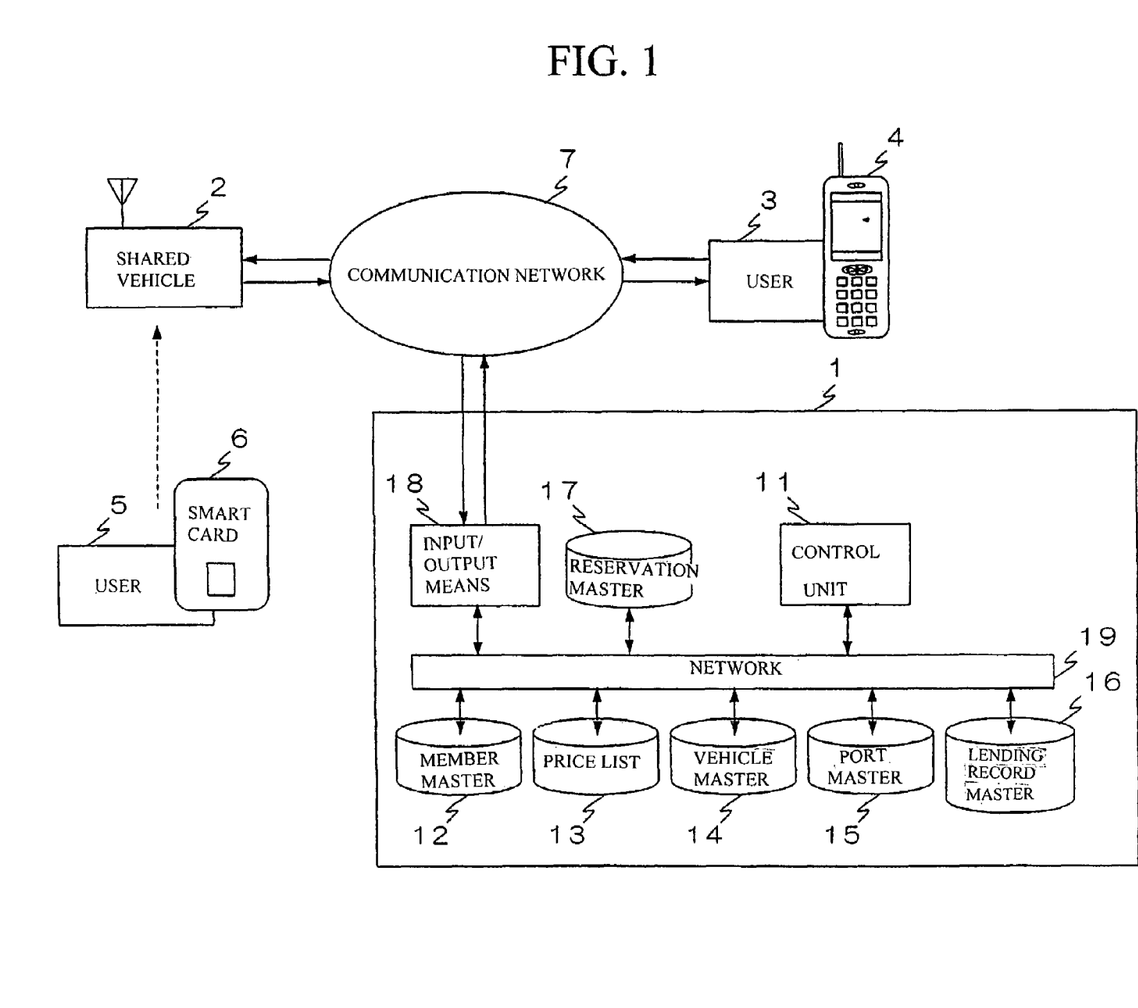
FIG. 1 is a block diagram showing a configuration according to an embodiment of the present invention.

FIG. 1 is a block diagram showing a configuration of an embodiment according to the present invention.

In FIG. 1, a control center 1 is a center for controlling a system for commonly utilizing a vehicle provided with a vehicle managing device which manages reservation or dispatch of a shared vehicle 2 that is parked in a parking area, called a port, and is commonly used by users, manages bill requests, and manages shared use of a vehicle. The shared vehicle 2 can be utilized by a user in two different ways, namely, by a "reservation ride" in which a user A3 registered as a member in the control center 1 makes a reservation, through the control center 1 using a portable terminal 4, by assigning information that specifies a vehicle, such as departure/arrival ports, date, time, and type of the vehicle, or by a "direct ride" in which a user B5 registered as a member in the control center 1 utilizes an available vehicle using a smart card 6 owned by the user B5 without making a reservation.

Also, a communication network 7 is a network for connecting the portable terminal 4 owned by the user A3 to the control center 1, or the shared vehicle 2 to the control center 1, and information is received and transmitted by, for example, wireless communication using a Wireless Application Protocol (WAP), the Internet using the World Wide Web (WWW), and a wired communication via public circuit network.

Note that one or more of the shared vehicles 2 are managed by the control center 1. Also, the number of the user A and user B is not limited.

Moreover, the portable terminal 4 is a terminal capable of connecting to a computer network, such as the Internet, and a public circuit network, and it includes not only a portable terminal including a portable phone and a Personal Handy Phone System telephone connected via a wireless communication and a mobile communication terminal but also a terminal which is connected via a wired communication. Furthermore, in the above-mentioned terminal using wired or wireless communication, a portable terminal capable of connecting to a computer network is included.

Also, the control center (vehicle managing device) 1 includes a control unit 11, a member master 12, a price list 13, a vehicle master 14, a port master 15, a lending record master 16, a reservation master 17, an input/output means 18, and a network 19.

The control unit 11 performs a vehicle management control program in a computer system provided with a central processing unit (CPU) to control the overall operation in the control center 1. The operation of the control unit 11 will be described later in detail.

The member master 12 is a database in which registered data of each user registered as a member is stored, and (1) user ID, (2) address, (3) use right information, etc., of each member are recorded.

The price list 13 is a database in which the charging system for the use of the shared vehicle 2 is stored, and (1) basic fee, (2) extension fee, (3) extra/discount fee, etc., are recorded.

The vehicle master 14 is a database in which conditions of each shared vehicle 2 are stored to manage the shared vehicle 2 and, for example, (1) vehicle number, (2) vehicle information including model (type), equipment, color, etc., (3) parking position (parking port), (4) availability of the vehicle, etc., of each shared vehicle are recorded.

The port master 15 is a database in which conditions relating to a port is stored to manage the shared vehicle 2 and, for example, (1) the number of vehicles parked in a parking area, (2) the number of available vehicles, (3) vehicle number of parked vehicles, etc., are recorded.

The lending record master 16 is a database in which use record of the shared vehicle 2 is stored and, for example, (1) user ID, (2) (rented) vehicle number, (3) rented time, (4) returning time, (5) rented place, (6) returning place, (7) mileage, (8) amount of fuel consumed, etc., are recorded.

The reservation master 17 is a database in which reservation information is stored to manage vehicle reservation by the user A3 utilizing the "reservation ride" and, for example, (1) departure port, (2) arrival port, (3) information of vehicle type, vehicle number, etc., in relation to the user ID of the user A3 are recorded.

The input/output means 18 is an interface unit for the control center 1 to receive/transmit information relating to reservation of renting a vehicle from/to the portable terminal 4, and to receive/transmit information relating to lending and returning of a vehicle, i.e., vehicle managing data, from/to the shared vehicle 2. Note that the receiving/transmitting of the vehicle managing data between the control center 1 and the shared vehicle 2 is directly carried out using wireless communication.

The network 19 is a communication network which connects the above-mentioned control unit 11, the member master 12, the price list 13, the vehicle master 14, the port master 15, the lending record master 16, the reservation master 17, and the input/output means 18 in the control center 1 to form a local area network (LAN) for receiving and transmitting data.

Next, the shared vehicle 2 used in an embodiment of the present invention will be explained with reference to accompanying drawings.

Figure 2:
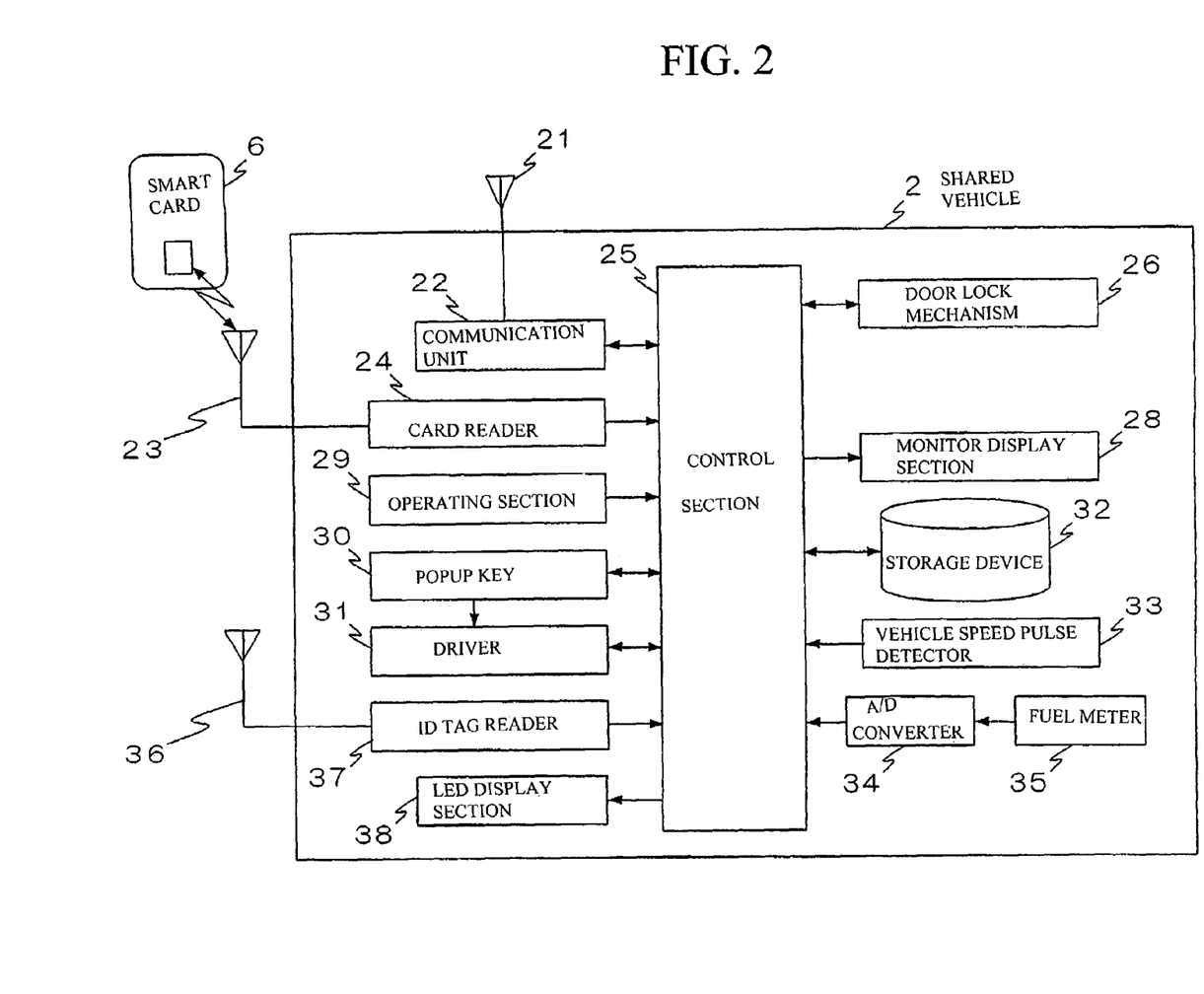
FIG. 2 is a diagram showing a configuration of a shared vehicle used in an embodiment of the present invention.

FIG. 2 is a block diagram showing a configuration of the shared vehicle 2. In FIG. 2, the shared vehicle 2 includes a communication antenna 21, a communication unit 22, an antenna for card 23, a card reader 24, a control section 25, a door lock mechanism 26, a monitor display section 28, an operating section, a popup key 30, a driving device 31, a storage device 32, a vehicle speed pulse detector 33, an A/D converter 34, a fuel meter 35, an antenna for tag 36, an ID tag reader 37, and a LED display section 38.

The shared vehicle 2 is parked at a parking space sufficient for one vehicle called a lot which is located in a parking area called a port. The control center 1 exchanges various data with the shared vehicle via the communication unit 22 connected to the communication antenna 21.

In the shared vehicle 2, when the user A3 or the user B5 holds, for instance, a non-contact read and write type smart card 6 to the antenna for card 23 provided with the shared vehicle 2, a signal read by the card reader 24 is transmitted to the control section 25 which controls the operation of the shared vehicle 2.

The control section 25 communicates with the control center 1 via the communication unit 22 and the communication antenna 21 using wireless communication, and asks for permission to lend the vehicle by transmitting that the user held the smart card 6 to ask for a use of the shared vehicle 2.

The storage device 32 is formed by a read only memory (ROM), a random access memory (RAM), etc., and user IDs of each of the users who can utilize the shared vehicle 2 are stored in advance. Also, the user ID, PIN, etc., input by the user is temporarily stored in the storage device 32.

When the user holds the smart card 6 to input his user ID, the control section 25 checks the input user ID with the user ID stored in the storage unit 32, and if both IDs matches, the door lock mechanism 26 releases the door key to lend the shared vehicle 2.

Also, when the control section 25 transmits the vehicle number stored in the storage device 32, the user ID input by a user, etc., to the control center 2, it is determined whether the shared vehicle 2 can be rented to the user, and the determination result as well as the user's PIN are transmitted to the shared vehicle 2. Then, it is confirmed by the control section 25 that the PIN input by the user matches the PIN transmitted from the control center 1, and when the destination of the vehicle by the user is set, the control section 25 allows to start the driving device 31 of the vehicle, such as the engine and motor using the popup key 30.

Here, the popup key 30 will be explained. The popup key 30 is, for example, an ignition device for a vehicle which is typically disclosed in Japanese Patent No. 3149384, and includes an operation knob which is rotatably and displaceably supported by a main body at only a protruded position so as to be freely protruded towards the interior of the vehicle, a rotor which rotates together with the operation knob, and an ignition switch (a mechanical switch device) having a point of contact corresponding to the rotation position of the rotor. The popup key 30 controls the start and stop of the driving device 31, such as the engine and motor, by connecting and disconnecting the point of contact corresponding to a rotation position as disclosed in the above patent document.

Also, the operation knob is urged towards the protruding position by a spring means, and the operation thereof is controlled by a means for selectively holding and releasing (protruding) it in a pushed-down position. Accordingly, when the operation knob of the popup key 30 is at a protruded state, it becomes possible to start the driving device 31 by rotating the operation knob, and when the operation knob of the popup key 30 is in the pushed-down state, it becomes impossible to start the driving device 31 since the operation knob cannot be rotated.

Note that the popup key is not limited to the above ignition device, and it can be any means which is provided with a mechanical switch device and which is capable of controlling the operation of the switch device.

The user A3 or the user B5, when renting the shared vehicle 2, inputs required items into the control section 25 using an operation unit 29 so as to start the driving device 31 of the shared vehicle 2 by the popup key 30, and starts the use of the shared vehicle 2. Also, when the user returns the shared vehicle 2 at a port, the user stops the driving device 31 using the popup key 30 at the port, and carries out a returning process by pushing down the operation knob of the popup key 30. In this embodiment, since the control of the driving device 31 by the popup key 30 becomes impossible if the pushed-down state of the operation knob of the popup key 30 is maintained, the control section 25 determines that the returning process is completed by the fact that the operation knob of the popup key 30 is held in the pushed-down position.

Note that the above-mentioned smart card 6 is an ID terminal mounted with an IC including a processor which is capable of reading and writing recorded ID numbers and of simple decision-making within the card. According to embodiments of the present invention, the ID terminal used for transmitting an ID number to the shared vehicle 2 may be not only a non-contact or contact reading and writing type IC card, but also any terminals capable of reading and writing recorded ID numbers, such as a magnetic card and a mobile phone incorporated with an IC chip, as long as the reading device of the shared vehicle 2 can correspond.

Also, when the shared vehicle 2 is running, a vehicle speed pulse signal which indicates the running state of the shared vehicle 2 is transmitted to the control section 25 from the vehicle speed pulse detector 33, and the fuel meter 35 is connected to the control section 25 via the A/D converter 34 so that the control section 25 can confirm the degree of consumption of the fuel.

Note that the operation that is carried out by a user when he rents the shared vehicle will be explained in detail later.

Also, the antenna for tag 36 and the ID tag reader 37 are devices used by the shared vehicle 2 parked in a port to distinguish the lot assigned in the port.

Moreover, the LED display section 38 indicates a state of the shared vehicle 2, such as "available", "reserved", "currently used", "maintenance", etc., using different colors or characters, and is a display section which is disposed at a position visible to the user from the outside of the shared vehicle 2. The LED display section 38 can be any display section as long as it is capable of informing the user of the state of the shared vehicle 2.

Figure 3:
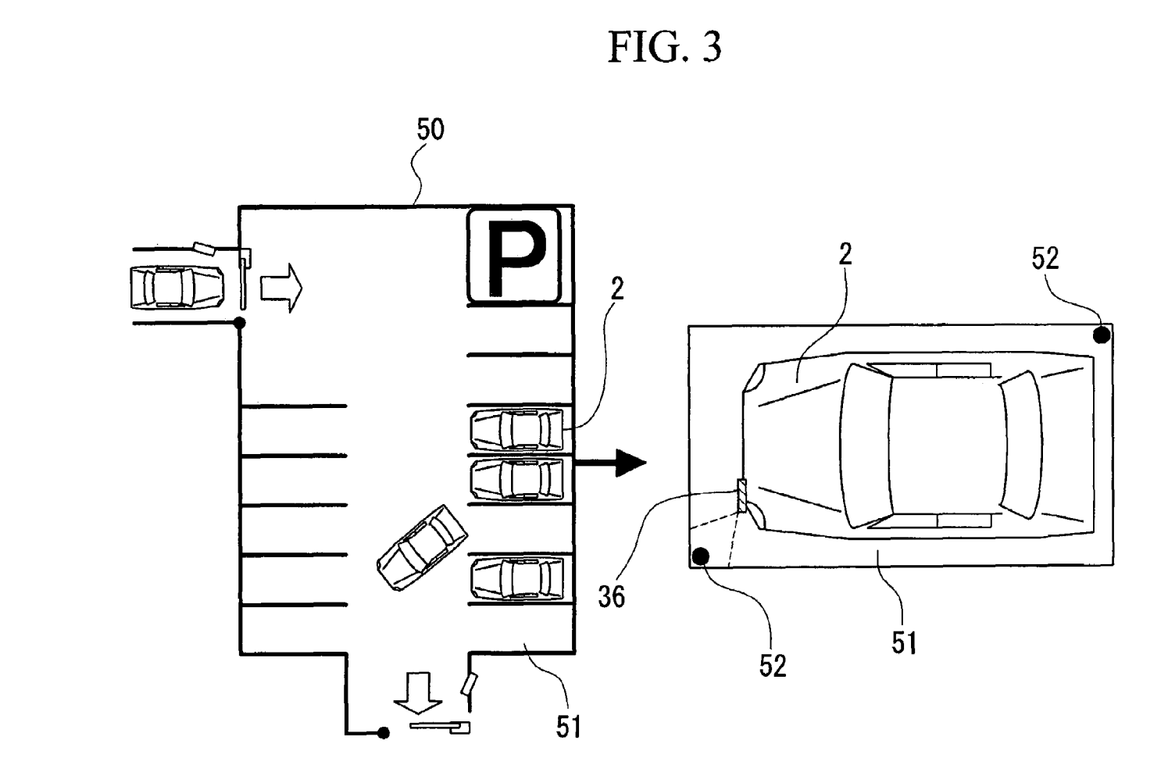
FIG. 3 is a diagram showing a port for parking the shared vehicle used in an embodiment of the present invention.

The tag will be explained with reference o FIG. 3. As shown in FIG. 3, a plurality of lots 51 used for parking the shared vehicle 2 are provided in a port 50, and an ID tag 52 which is a device for transmitting ID numbers assigned to each one of the port 50 and the lots 51 is provided to each one of the lots 51.

ID numbers specific to each one of the port 50 and lots 51 are transmitted and received between the ID tag 52 and the antenna for tag 36 using any one of electromagnetic coupling, electromagnetic induction, microwave, electrostatic coupling, and phototransmission means, and the shared vehicle 2 determines the port or lot at which it is parked by reading the signal received via the antenna for tag 36 using the ID tag reader.

Note that as shown in FIG. 3, the ID tag 52 is disposed at two diagonal corners of the lot 51 so as to correspond to a front stop and a rear stop of the shared vehicle 2, and the antenna for tag 36 is disposed at either a front corner or a rear corner (the front left corner in FIG. 3) closer to the ID tag 52 of the shared vehicle 2.

Also, the mechanism by which the shared vehicle 2 recognizes the position of the parked port or the lot is not limited to the ID tag 52, and it is possible to utilize a transceiver used for an electric toll collection system (ETC) or a position detection means using a global positioning system (GPS).

Next, a vehicle lending operation of the system for commonly utilizing a vehicle according to an embodiment of the present invention will be explained with reference to the accompanying drawings.

Figure 4:
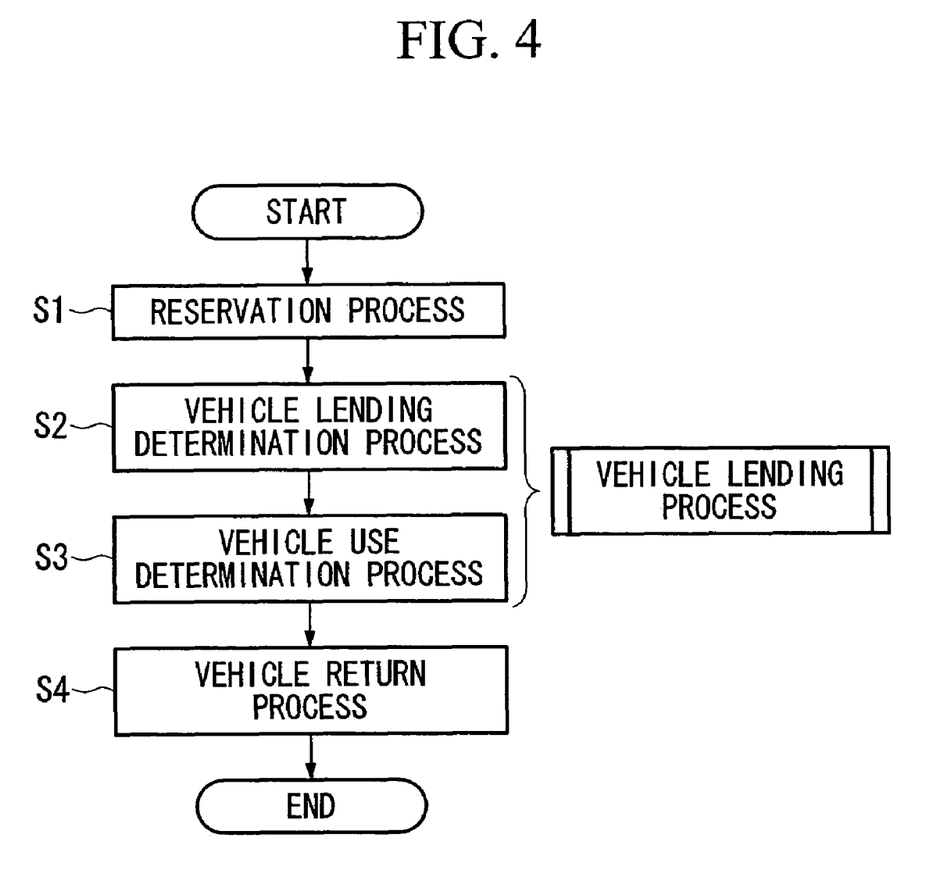
FIG. 4 is a diagram showing an overall operation of the system for commonly utilizing a vehicle according to an embodiment of the present invention.

First, the overall process flow of the system for commonly utilizing a vehicle will be explained with reference to the flowchart shown in FIG. 4.

The user A3, when wishing to make a reservation of the shared vehicle 2, accesses to the control center 1 using the portable terminal 4 via the communication network 7, such as the Internet, to carry out a reservation process (step S1). Then, when a right to use the shared vehicle 2 is secured, goes to the actual port where the shared vehicle 2 is parked, and holds his smart card 6 to the antenna for card 23 of the shared vehicle 2 in order to present his own user ID.

Also, if the user B5 wishes to utilize the shared vehicle 2 without making the reservation, the reservation process (step S1) is not carried out, and the user B5 directly goes to the port where the shared vehicle 2 is parked and holds his smart card 6 to the antenna for card 23 of the shared vehicle 2 that he wishes to use in order to present his own user ID.

The shared vehicle 2 to which the user ID card is presented, determines whether the user can access the inside of the vehicle, and carries out a vehicle lending process with the control center 1 in order to lend the user the shared vehicle 2.

Note that the vehicle lending process includes a vehicle lending determination process (step S2) which is mainly carried out at the control center 1 side and a vehicle use determination process (step S3) which is mainly carried out at the shared vehicle 2 side.

Here, the vehicle lending determination process (step S2) includes a process for confirming the user ID granted to the user. Also, the control section 25 of the shared vehicle 2, when the user A3 or the user B5 makes access to the shared vehicle 2 using the smart card 6, reads the user ID recorded in the smart card 6 using the card reader 24, and determines whether the user can access the inside of the vehicle while making an inquiry to the control center 1 about the user ID via the communication device 22 and the communication antenna 21.

On the other hand, in the control unit 11 of the control center 1, when inquired about the user ID from the shared vehicle 2 the user desires to use, determines whether the user can use the vehicle, and sends a signal to the shared vehicle 2 indicating whether the user can use the vehicle or not.

Also, if the user is allowed access to the vehicle, he inputs the assigned PIN using the operation unit 29 of the shared vehicle 2, and the shared vehicle 2 carries out the vehicle use determination process (step S3). In this embodiment, the vehicle use determination process is a process in which the PIN assigned to the user is confirmed, and when the user A3 or the user B5 inputs his PIN through the operation unit 29, the control section 25 of the shared vehicle 2 determines whether the input PIN matches with the PIN which was assigned to the user A3 or B5 and was transmitted from the control center 1. If it is determined that the PIN matches, the control section 25 of the shared vehicle 2 makes the operation knob protrude, which was in a pushed-down state and in which it was impossible to operate the popup key 30, so that the user can start the driving device 31 of the shared vehicle 2 by operating the popup key 30 to start using the shared vehicle 2.

Then, when the user, who has been allowed to use the shared vehicle in the vehicle lending determination process and the vehicle use determination process, is to terminate the use of the shared vehicle 2, the user carries out a vehicle returning process (step S4) of the shared vehicle 2 to a port so that the control center 1 can obtain user information of the vehicle which is used for calculating the charge. In this manner, the operation of the system for commonly utilizing a vehicle according to the embodiment of the present invention is terminated. Here, in the returning process, the control section 25 of the shared vehicle 2 starts the process when the user pushes down the operation knob of the popup key 30 to be in a pushed-down state, and the control section 25, if there is no problem about the returning condition, holds the operation knob of the popup key 30 in the pushed-down state to prohibit the use of the popup key 30. In this manner the returning process is completed.

Note that the use information of the vehicle means information necessary for calculating the fee of the shared vehicle 2, such as lending time, returning time, mileage, and amount of fuel when returned (fuel consumed).

Figure 5:
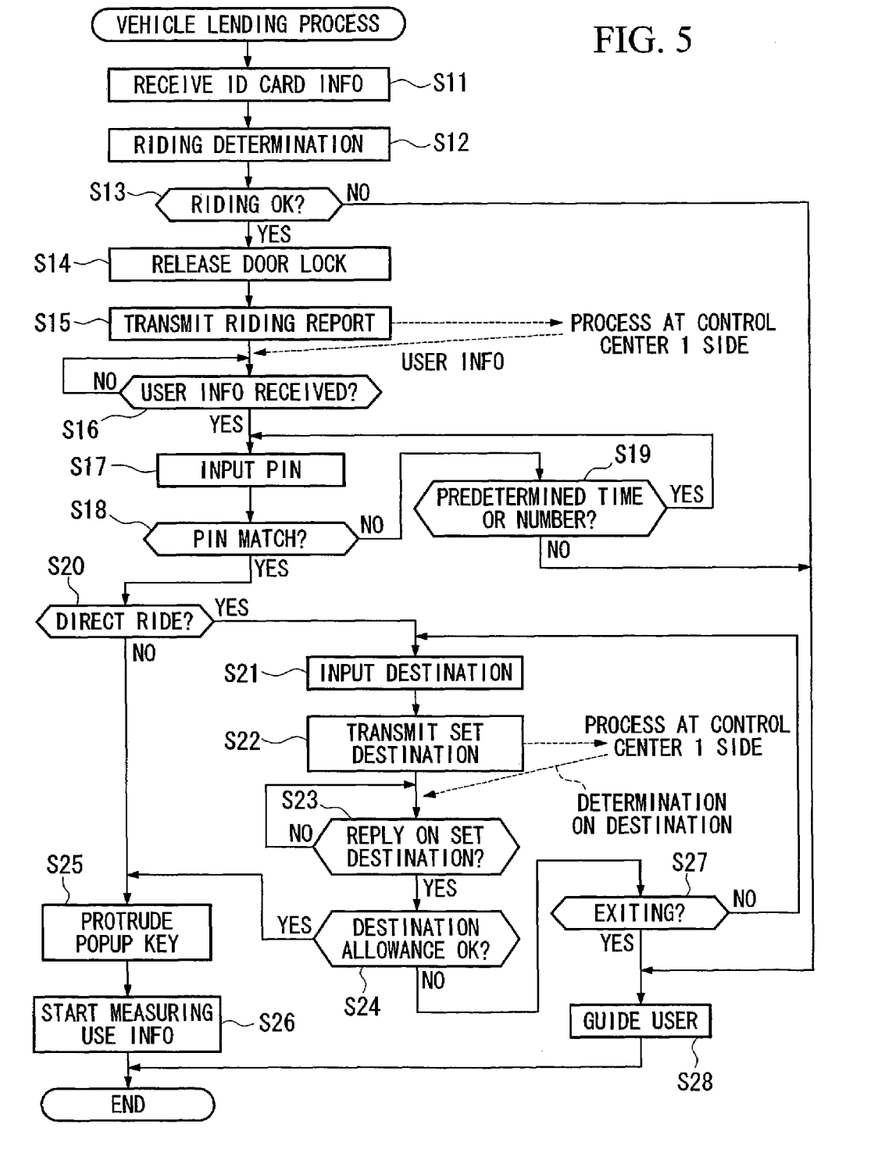
FIG. 5 is a diagram showing a vehicle lending operation in the system for commonly utilizing a vehicle according to an embodiment of the present invention.

Next, the above-mentioned vehicle lending process including the vehicle lending determination process and the vehicle use determination process will be explained in detail with reference to the flowchart shown in FIG. 5.

First, the control section 25 of the shared vehicle 2, when the user A3 or the user B5 accesses the shared vehicle 2 using the smart card 6, reads the user ID recorded in the smart card 6 using the card reader 24 (step S11), and carries out a riding permission determination by comparing the ID with user IDs recorded in the storage device 32 to which lending of a vehicle has been allowed, to determine whether lending of a vehicle is allowed for the user who wishes to use the shared vehicle 2 (step S12).

Then, as a result of the riding permission determination in step S12, it is determined whether the riding of the user who wishes to use the shared vehicle 2 has been allowed (step S13).

In step S13, if the riding of the user who wishes to use the shared vehicle 2 has been allowed (i.e., YES in step S13), the control section 25 of the shared vehicle 2 releases the door lock (step S14), and permits the user to access the inside of the vehicle.

Then, the control section 25 of the shared vehicle 2 transmits a riding report, such as the user ID of the user and the vehicle number of the vehicle, to the control center 1 via the communication device 22 and the communication antenna 21 (step S15).

Here, the control unit 11 of the control center 1 which received the riding report from the control section 25 of the shared vehicle 2, the use of which was requested by the user A3 or B5, determines whether the use of the vehicle by the user is allowed or not based on the received user ID, and transmits user information including signals indicating the PIN assigned to a user having the received ID and whether a reservation has been made by the user, to the shared vehicle 2.

Then, the control section 25 of the shared vehicle 2 determines whether the user information from the control center 1 was received as a reply to the riding report (step S16).

In step S16, if it is determined that the user information from the control center 1 has not been received, it waits until the user information is received (i.e., NO in step S16).

Also, in step S16, if it is determined that the user information from the control center 1 has been received (i.e., YES in step S16), the user who has been allowed access inside the vehicle through the door being unlocked, is asked to input the PIN assigned to the user through the operation unit 29 of the shared vehicle 2 (step S17).

When the PIN was input, the control section 25 of the shared vehicle 2 checks it against the PINs stored in the storage device 32 to determine whether there is a PIN which matches the PIN input by the user (step S18).

In step S18, if the PIN input by the uses does not match any of the PINs stored in the storage device 32 (i.e., NO in step S18), it is determined whether the number of checking PINs has been carried out within a predetermined time period or is within a predetermined number (step S19).

In step S19, if the number of checking PINs has been carried out within the predetermined time or is within the predetermined number (i.e., YES in step S19), the process returns to step S17 to repeat the processes explained above.

Also, in step S18, if the PIN input by the user matches one of the PINs stored in the storage device 32 (i.e., YES in step S18), it is determined whether or not this lending operation of the vehicle corresponds to the "direct ride" based on the signal, which is contained in the user information, indicating whether the user has made a reservation for the vehicle (step S20).

In step S20, if it is determined that the lending operation of the vehicle is for a "direct ride" (i.e., YES in step S20), the user is asked to input the destination (destination port) of the vehicle through the operation unit 29 of the shared vehicle 2 (step S21).

If the destination is set by the user, the control section 25 of the shared vehicle 2 transmits the destination setting to the control center 1 via the communication device 22 and the communication antenna 21 (step S22).

The control unit 11 of the control center 1 which received the destination setting from the control section 25 of the shared vehicle 2, determines whether the received destination is allowed to be a destination of the vehicle, and transmits the determination result on the destination setting to the shared vehicle 2.

Then, the control section 25 of the shared vehicle 2 determines whether the determination result on the destination setting has been received from the control center 1 as a reply to the destination setting (step S23).

In step S23, if the determination result on the destination setting has not been received from the control center 1, it waits until the determination result on the destination setting is received (i.e., NO in step S23).

Also, in step S23, if the determination result on the destination setting has been received from the control center 1 (i.e., YES in step S23), it is determined whether the destination of the vehicle has been admitted by the determination result on the destination setting (step S24).

In step S24, if the destination of the vehicle has been allowed (i.e., YES in step S24), the user starts using the sharing vehicle 2 by operating the popup key 30 to actuate the driving device 31 which becomes possible because the control section 25 of the shared vehicle 2 makes the operation knob of the popup key 30 protrude, making it possible to operate the operation knob of the popup key 30 (step S25), and starts timers for items, which are contained in the use information, necessary for calculating charges of the shared vehicle 2, such as the above mentioned lending time, returning time, mileage, and remaining fuel when returned (fuel consumption) are started (step S26).

Also, in step S24, if the destination of the vehicle is not allowed (i.e., NO in step S24), the control section 25 of the shared vehicle 2 confirms whether the user intends to get off the vehicle through the monitor display section 28 (step S27), and if the user does not get off the vehicle (i.e., NO in step S27), the process returns to step S22 to repeat the processes explained above.

In step S27, if the user gets off the vehicle (i.e., YES in step 27), the procedure for getting off the vehicle is shown on the monitor display section 28 in order to guide the user (step S28).

Also, in step S20, if the vehicle lending process is not for the "direct ride" (i.e., NO in step S20), the process proceeds to step S25 since the destination setting was completed when the reservation was made. In step S25, since the control section 25 of the shared vehicle 2 makes the operation knob of the popup key 30, making it possible to operate the operation knob of the popup key 30. (step S25) and starts timers for items, which are contained in the use information, necessary for calculating charges of the shared vehicle 2, such as the above mentioned lending time, returning time, mileage, and remaining fuel when returned (fuel consumption) (step S26), the user starts using the sharing vehicle 2 by operation the popup key 30 to actuate the driving device 31.

On the other hand, in step S13, if the use of the shared vehicle 2 by the user who wishes to utilize the vehicle is not allowed (i.e., NO in step S13), or in step S19, if the number of checking PINs has not been carried out within the predetermined time or it is not within the predetermined number (i.e., NO in step S19), the process proceeds to step S28 to show the procedure for getting off the vehicle on the monitor display section 28 in order to guide the user.

Figure 6:
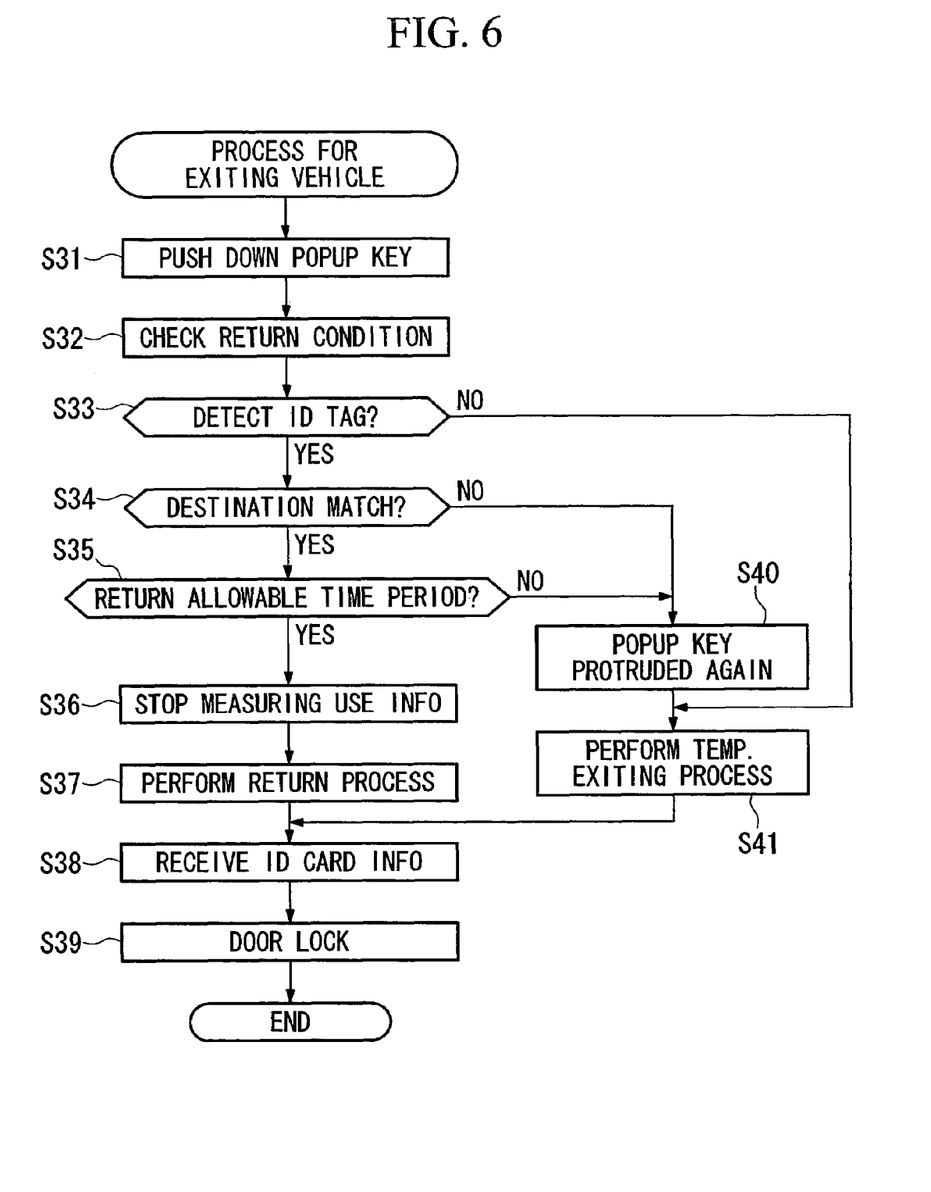
FIG. 6 is a diagram showing a process for exiting the vehicle in the system for commonly utilizing a vehicle according to an embodiment of the present invention.

Next, a procedure for carrying out the above-mentioned vehicle returning process or a procedure for temporarily exiting the vehicle will be explained with reference to the flowchart shown in FIG. 6.

First, when the user exits the shared vehicle 2, the user operates the popup key 30 to stop the driving device 3land then pushes down the operation knob of the popup key 30 (step S31).

When the operation knob of the popup key 30 is pushed down, the control section 25 of the shared vehicle 2 checks the returning condition of the vehicle (step S32).

Firstly, it is determined whether the shared vehicle 2 has arrived at a port and detected the ID tag 52 (step S33).

If the ID tag 52 was detected in step S33 (i.e., YES in step S33), it is determined whether the port at which the shared vehicle 2 has arrived matches the port of destination (step S34).

In step S34, if it is determined that the port at which the shared vehicle 2 has arrived matches the port of destination (i.e., YES in step S34), it is determined whether the time of the day is in a time period in which the return of the vehicle is allowed (step S35).

In step S35, if the time is in the time period in which the return of the vehicle is allowed (i.e., YES in step S35), the timers for items, which are contained in the use information of the vehicle, necessary for calculating charges of the shared vehicle 2, such as the above mentioned lending time, returning time, mileage, and remaining fuel when returned (fuel consumption) are stopped (step S36).

Then, a returning process including a charging process which is carried out by using the use information obtained during the use of the shared vehicle, is carried out (step S37).

The control section 25 of the shared vehicle 2 performs the returning process, and when the user exits the shared vehicle 2 and holds his smart card 6 to the shared vehicle 2, reads the user ID recorded in the smart card 6 using the card reader 24 (step S38), and locks the door (step S39) to terminate the process for exiting the vehicle.

Also, in step S34, if the port at which the vehicle has arrived does not match the port of destination (i.e., NO in step S34), or in step S35, if the time is not within the time period in which the return of the vehicle is allowed (i.e., NO in step S35), access to the returning process is refused due to unsatisfactory returning conditions at the arrived port, and the operation knob of the popup key 30 is again protruded (step S40).

Then, while the charging process is continued, the process for temporary exiting the vehicle is carried out (step S41).

On the other hand, if the ID tag 52 cannot be detected in step S33 (i.e., NO in step S33), it is assumed that the shared vehicle 2 is parked at a place other than the port and that the user temporary exits the vehicle. Thus, the process proceeds to step S41, and carries out the process for temporary exiting the vehicle while continuing the charging process (step S41).

Then, in step S38, the control section 25 of the shared vehicle 2, when the user exits the shared vehicle 2 and holds his smart card 6 to the shared vehicle 2, reads the user ID recorded in the smart card 6 using the card reader 24 (step S38), and locks the door (step S39) to terminate the process for exiting the vehicle.

Note that, in this embodiment, the control section 25 of the shared vehicle 2 forms the ignition mechanism controlling means and the use information controlling means. More specifically, steps S17-S25 shown in FIG. 5 and steps S31-S40 shown in FIG. 6 correspond to the ignition mechanism controlling means, and step S26 shown in FIG. 5 and step S36 shown in FIG. 6 correspond to the use information controlling means.

As explained above, according to the system for commonly utilizing a vehicle of the invention, since the popup key is used and it is riot necessary to provide a portable ignition key, the danger that the ignition key will be stolen or that the vehicle itself will be stolen using a copied ignition key is eliminated.

Also, since a means for controlling the operation of the ignition mechanism is provided with the ignition mechanism itself, it is not necessary to newly provide a device for storing the ignition key, and hence this is advantageous in terms of cost.

Moreover, although it becomes impossible to move the vehicle in which the entire ignition mechanism is formed only by electrical controlling means if electricity cannot be supplied to the controlling means is an emergency, etc., the vehicle utilizing the popup key can be moved if only the means for selectively holding the operation knob at the pushed-down state is released.

INDUSTRIAL APPLICABILITY

As described above, according to the first embodiment of the present invention, it becomes possible to control the lending and returning of the vehicle using the operation of the ignition mechanism provided with the mechanical switch device. Also, it becomes possible to permit the return of the vehicle only when returning conditions are met.

Accordingly, since it becomes unnecessary to provide and manage a portable ignition key, there is an advantage that the danger that the vehicle is stolen will be eliminated. Also, since a returning operation is not possible other than at the parking area, it becomes possible to prevent illegal return of the vehicle or the vehicle from being abandoned.

According to the second embodiment of the present invention, it becomes possible to carry out a constant and accurate charging process regardless of the manner in which a vehicle is used since the start and stop of the measurement on the vehicle use state is carried out in accordance with the state of the ignition mechanism which indicates the start and end of the use of the vehicle.

Accordingly, even if illegal return of the vehicle to a place other than the parking area occurs or a user abandons the vehicle, the effect that a justifiable fee amount can be charged to the user is obtained since the charging process is not stopped during that period.

The invention claimed is:

1. A system for commonly utilizing a vehicle in which vehicle use information relating to lending and returning of a vehicle parked in a parking area is managed, and the vehicle is lent to a user by confirming permission to utilize the vehicle based on preregistered personal identification information, wherein the vehicle comprises:
a mechanical switch device, which is used to start a driving device of the vehicle, and an ignition mechanism which is capable of controlling an operation of the mechanical switch device, the ignition mechanism including an operation knob, which is adjustably disposed in a protruded state and in a pushed-down state; and
an ignition mechanism controlling means which permits a starting operation of the driving device using the ignition mechanism by setting the operation knob in the protruded state, when information input by the user matches personal cipher information imparted to the user in association with the personal identification information and the user sets a destination, and which permits a returning operation of the vehicle using the ignition mechanism and permits the operation knob to be in a pushed-down state when arrival at the set destination is detected.

2. A system for commonly utilizing a vehicle according to claim 1, wherein the vehicle further comprising:
a use information controlling means which starts measurement of the vehicle use information when the starting operation of the driving device using the ignition mechanism is permitted, and which stops the measurement of the vehicle use information when the returning operation of the vehicle using the ignition mechanism is permitted.

* * * * *